United States Patent [19]

Burke

[11] Patent Number: 4,593,763

[45] Date of Patent: Jun. 10, 1986

[54] CARBON DIOXIDE WELL INJECTION METHOD

[75] Inventor: Edward M. Burke, Willow Park, Tex.

[73] Assignee: Grayco Specialist Tank, Inc., Fort Worth, Tex.

[21] Appl. No.: 642,148

[22] Filed: Aug. 20, 1984

[51] Int. Cl.$^4$ .................. E21B 43/25; E21B 43/267
[52] U.S. Cl. ........................ 166/302; 166/57; 166/91; 166/305.1; 166/308
[58] Field of Search ............ 166/57, 75 R, 79, 91, 166/268, 280, 302, 305 R, 308

[56] References Cited

U.S. PATENT DOCUMENTS

| | | | |
|---|---|---|---|
| 2,632,302 | 3/1953 | Steele | 62/55 |
| 3,004,601 | 10/1961 | Bodine | 166/302 |
| 3,195,634 | 7/1965 | Hill | 166/302 |
| 3,213,939 | 10/1965 | Records | 166/54 X |
| 3,424,254 | 1/1969 | Huff | 166/302 X |
| 3,842,910 | 10/1974 | Zingg et al. | 166/308 X |
| 4,212,354 | 7/1980 | Guinn | 166/303 |
| 4,390,068 | 6/1983 | Patton et al. | 166/305 R X |
| 4,398,604 | 8/1983 | Krajicek et al. | 166/53 X |

*Primary Examiner*—George A. Suchfield

*Attorney, Agent, or Firm*—James E. Bradley; Charles D. Gunter, Jr.

[57] ABSTRACT

A method for injecting carbon dioxide into a well is shown, in which carbon dioxide is supplied at the well site in a tank maintained at sufficient pressure to keep the carbon dioxide in the liquid state. As the carbon dioxide is withdrawn from the tank and transferred to the high pressure well pump, supplemental cooling is provided intermediate the tank and pump to maintain the carbon dioxide in the liquid state. The supplemental cooling is provided by passing the carbon dioxide withdrawn from the tank through a heat exchanger, the cooling effect being provided by separating a liquid-vapor stream from a predominantly liquid stream of carbon dioxide, expanding the liquid-vapor stream in the heat exchanger to cool the heat exchanger, and passing the predominantly liquid stream separately through the heat exchanger to cool the predominantly liquid stream. The expanded carbon dioxide vapor utilized in the heat exchanger is recompressed and recirculated to the tank, to maintain the tank pressure to avoid vaporization of the carbon dioxide between the tank and the high pressure pump.

5 Claims, 1 Drawing Figure

CARBON DIOXIDE WELL INJECTION METHOD

BACKGROUND OF THE INVENTION

1. Field of the Invention

This invention relates to methods of treating oil and gas wells with carbon dioxide and, specifically, to an improved method for reducing the vaporization of carbon dioxide during the injection operation.

2. Description of the Prior Art

Various well stimulation techniques are known for increasing the production rate of oil and gas wells, including hydraulic fracturing and injection treatments with chemicals. In the fracturing treatment, a liquid slurry under high pressure is pumped into the well to cause cracks or fissures in the formation. Various proppants such as glass beads, sand particles, or the like, can be incorporated in the slurry to enter the cracks created by the high pressure fluid, to prop the cracks open for improved formation flow.

Carbon dioxide has been found to be advantageous for mixing with the well treating slurry. Among other advantages, carbon dioxide reduces swelling in clay sensitive formations, lowers the pH of the well treating fluid, and can be helpful in removing blocks from the formation. When carbon dioxide is used with a liquid treating solution, it is normally pumped in the liquid state. As the carbon dioxide exceeds its vaporizing temperature at the injection pressure, it begins changing into a vapor state, or gas. As the carbon dioxide undergoes the phase change to a gas, its volume increases dramatically. The carbon dioxide gas enters the perforations in the formation and forms a gas lift for lifting the treating fluids out of the well after the surface pressure is removed, thus facilitating cleanup operations.

U.S. Pat. No. 4,212,354 illustrates a problem associated with obtaining a sufficiently high flow rate of carbon dioxide to mix with the fracturing slurry being pumped into the well. The carbon dioxide is normally brought to the well site in a tank truck. The temperature is maintained at about −20° F. to 0° F., and the pressure is around 250 to 300 psig (pounds per square inch gage). Under these conditions, the carbon dioxide is liquid except for a small vapor blanket at the top of the tank.

In the past, the liquid carbon dioxide was drawn off to a booster pump, which would increase the liquid pressure about 50 to 125 psig above the tank pressure. The purpose of the booster pump was to reliquify partially vaporized carbon dioxide that vaporizes in the tank discharge line, due to the pressure drop and warming of the liquid. However, withdrawal of liquid from the tank causes the tank pressure to drop, and consequently more and more carbon dioxide vaporizes in the line. The vapor blanket in the tank increases in size, but the liquid in the tank does not vaporize fast enough to maintain the tank at a pressure sufficient to prevent "flashing" in the discharge line. The fast vaporization in the discharge line, or "flashing", absorbs the latent heat of vaporization and lowers the liquid temperature drastically. The temperature drop may go below the freezing point of carbon dioxide, freezing the liquid carbon dioxide and blocking the line. In addition, a large amount of vapor may case the booster pump to vapor lock. This would result in only small flow rates of carbon dioxide being supplied to the well head.

The phase changes discussed above can adversely affect the fracturing treatment, since the treatment cannot be temporarily stopped during the fracturing operation. Otherwise, the well will "sand up", due to the large amount of sand in the slurry on its way to the perforations. If the carbon dioxide booster pump vapor locks, or if the line freezes, the carbon dioxide must be deleted from the remainder of the well treatment.

In U.S. Pat. No. 4,212,354, a portion of the carbon dioxide in the discharge line is recirculated to the top of the tank after being heated in a vaporizer. By recirculating the vaporized carbon dioxide to the tank, the tank pressure is maintained substantially constant. While this scheme presents a solution to the problem, the booster pump is not eliminated, and some operators object to the presence of a heater at the well site.

SUMMARY OF THE INVENTION

A method is provided for injecting carbon dioxide into a well, which includes the steps of transporting the carbon dioxide to the well site in a tank, maintaining the temperature and pressure during transporting to maintain the carbon dioxide in a predominantly liquid state, and withdrawing the carbon dioxide from the tank and pumping liquid carbon dioxide down the well with a high pressure pump. The inventive method reduces vaporization of carbon dioxide between the tank and pump by providing supplemental cooling to the carbon dioxide which is withdrawn from the tank, at a point intermediate the tank and the inlet of the high pressure pump. The supplemental cooling maintains the carbon dioxide entering the high pressure pump in a liquid state, without the use of intermediate booster pumps.

Preferably, the supplemental cooling is provided by passing the carbon dioxide withdrawn from the tank through a heat exchanger. The cooling effect is provided by separating a liquid-vapor stream from a predominantly liquid stream of carbon dioxide, expanding the liquid-vapor stream in the heat exchanger to cool the heat exchanger, and passing the predominantly liquid stream through tubes of the heat exchanger to cool the predominantly liquid stream. The expanded carbon dioxide vapor utilized in the heat exchanger can be recompressed to the approximate pressure of the tank, thereby warming the recompressed vapor, and recirculated to the tank to maintain tank pressure.

Additional objects, features and advantages will be apparent in the written description which follows.

DETAILED DESCRIPTION OF THE INVENTION

Figure 1:
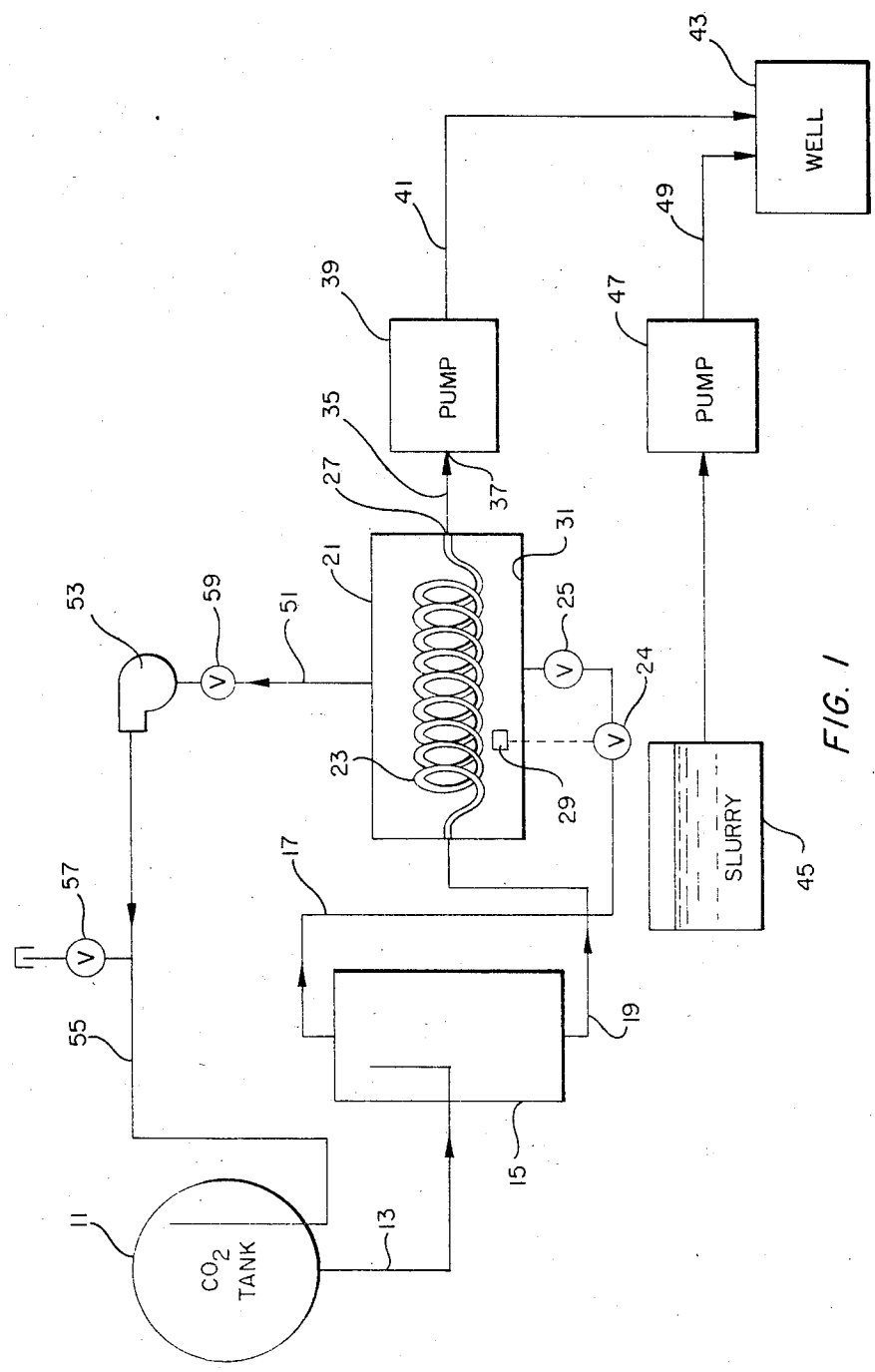
FIG. 1 is a schematic view of the carbon dioxide well injection method of the invention.

The temperatures and pressures at which carbon dioxide undergoes changes in phase of liquid, solid and gas are well known and published in many texts, such as "Handbook of Chemistry and Physics", 43rd Edition, 1961, on pages 2500 and 2501. This material is incorporated by reference herein.

Referring to FIG. 1, carbon dioxide is stored at the well site in a tank 11 which can, for instance, be mounted on wheels and towed by a truck (not shown). The carbon dixode is loaded into a tank at a manufacturing plant in the known manner to preserve most of the tank contents in a liquid state. In order to avoid explosive conditions, a vapor blanket, equal to about 5% of the volume of the tank, is left in the tank. The tank is normally insulated and capable of withstanding pressure to about 500 psig. Such tanks typically have a capacity in the range from about 50 to 120 barrels, and it is customary to utilize several tanks placed parallel at a well site to deliver large quantities of carbon dioxide. Normally the tank is transported to the well site with an internal pressure of about 250 to 350 psig and a liquid carbon dioxide temperature in the range of about −20° F. to 0° F.

At the well site, carbon dioxide is withdrawn from the bottom of the tank through a discharge line 13 and passed to a vapor separator chamber 15, where the carbon dioxide is separated into a liquid-vapor stream 17, and a predominantly liquid stream 19. The vapor separator chamber 15, in one embodiment, is approximately 18 inches in diameter and two to three feet long. The purpose of the chamber is to flash any liquid which has picked up heat in the discharge line 13 and has gone through a pressure drop. Carbon dioxide which is withdrawn from the tank 11 is typically fed to the chamber 15 at a rate of up to 30 barrels per minute, with the pressure in the chamber 15 being in the range from about 250 to 300 psig.

The output from the vapor separator chamber 15 passes to a heat exchanger 21 where supplemental cooling is provided for the carbon dioxide withdrawn from the tank. The predominantly liquid stream 19 leaving the chamber 15 enters the tubes 23 of the shell and tube heat exchanger 21 at the approximate tank pressure of 250 to 300 psig and at about −20° F. to 0° F. The liquid-vapor stream 17 leaving the chamber 15 is passed through an on-off valve 24 and a pressure reducing valve 25 to the low pressure, shell side of the heat exchanger 21. As the liquid-vapor stream 17 passes through the pressure reducing valve 25, it is reduced to a lower pressure, causing the carbon dioxide to boil and form a vapor layer in the upper portion of the heat exchanger shell. The boiling of the carbon dioxide cools the predominantly liquid stream 19 in the tubes 23, so that the liquid stream at the heat exchanger outlet 27 is cooled to about −31° F. Valve 25 can be adjusted to maintain a constant pressure drop for the liquid vapor stream 17 entering the heat exchanger shell.

A control means such as float valve 29 located within the shell side 31 of the heat exchanger is responsive to the liquid level within the heat exchanger 21. As the liquid level within the heat exchanger 21 fluctuates, the control means 29 acts to open and close the on-off valve 24. Preferably, the liquid level within the heat exchanger 21 is sufficient to cover the tubes 23 while leaving about one half of the vessel interior as head space or disengagement area.

The outlet 27 from the heat exchanger 21 is connected by a conduit 35 to the inlet 37 of a high pressure pump 39. The high pressure pump 39 is a positive displacement "triplex" type pump, capable of delivering high pressures and volume. Typical pressures will be 2000 to 10,000 psig, and flow rates of 30 barrels per minute or more are desired. The discharge of the high pressure pump 39 is connected to a line 41 leading to the well, indicated as 43. The frac slurry, or treating liquid for other treatments, is pumped from a tank 45 by a high pressure pump 47 through a line 49 to the well 43. The liquid carbon dioxide combines or commingles with the liquid slurry as the liquids are pumped down the well.

In addition to providing supplemental cooling to the carbon dioxide which is withdrawn from the tank 11 and passed to the inlet 37 of the high pressure pump 39, the present method also recirculates the expanded carbon dioxide vapor utilized in the heat exchanger 21 to the tank 11. This is accomplished by withdrawing the carbon dioxide vapor from the heat exchanger 21 through a line 51. The control means 29 within the heat exchanger 21 provides a head space or disengagement area of about one half the capacity of the vessel to prevent liquid from being within through line 51.

Also, a backpressure valve 59 prevents the pressure in line 51 from falling to a pressure where $CO_2$ ice crystals could form and enter the compressor. To maintain the carbon dioxide in the liquid-vapor state, backpressure valve 59 is set to maintain a minimum pressure in the range from about 75–100 psi, preferably greater than about 100 psi. Carbon dioxide vapor withdrawn through line 51 is passed to a compressor 53 where the vapor is compressed to the approximate tank pressure, thereby warming the vapor. The warmed, vaporized carbon dioxide is discharged through a conduit 55 into the tank 11, thereby raising the temperature of the tank to increase the tank pressure. A relief valve 57 is provided to insure that a safe maximum pressure is not exceeded in conduit 55 or tank 11.

The operation of the present invention will now be described. Typical fracturing treatments last about 45 minutes to one hour of high pressuring pumping time. On large scale jobs, the pumping time can be several hours. Liquid carbon dioxide withdrawn through discharge line 13 passes from tank 11 to a vapor separator 15. The separator 15 is utilized to provide a predominantly liquid stream of carbon dioxide to the inlet of the high pressure, tube side 23 of a heat exchanger 21. The liquid-vapor stream 17 from the chamber 15 passes through an on-off valve 24 and a pressure reducing valve 25 and is expanded within the shell side 31 of the heat exchanger 21 to provide supplemental cooling for the liquid carbon dioxide passing out the heat exchanger outlet 27. By cooling the carbon dioxide liquid in conduit 35 in the range of −31° F., vapor locks in the high pressure pump 39 are prevented, and it is not necessary to utilize booster pumps intermediate the tank and high pressure pump 39.

Carbon dioxide vapor withdrawn from the disengagement area of the heat exchanger 21 passes through a line 51 and back pressure valve 59 to a compressor 53 where it is recompressed and recirculated through a conduit 55 to the tank 11. By recompressing and recirculating the carbon dioxide vapor, the tank pressure is maintained at a level equal to or higher than the initial tank pressure to avoid vaporization between the tank 11 and the high pressure pump 39. Any vapor above that required to maintain the desired tank pressure is vented to atmosphere through relief valve 57. It is not necessary to utilized heaters, which can pose safety hazards.

The present invention can be seen to provide several significant advantages. By supplementally cooling the liquid carbon dioxide, detrimental vaporization is eliminated prior to reaching the high pressure well pumps. The recirculation loop maintains tank pressure to prevent flashing and ice blocks and applies a positive pressure to the high pressure well pump. The carbon dioxide can be pumped into the well at higher rates as a liquid, through the use of the method of the invention. The additional expense of booster pumps is also eliminated.

While the invention has been shown in only one of its forms, it is not thus limited, but is susceptible to various changes and modifications, without departing from the spirit thereof.

I claim:

1. In a method of injecting carbon dioxide into a well including the steps of transporting the carbon dioxide to the well site in a tank, maintaining the temperature and pressure during transporting to maintain the carbon dioxide predominantly in a liquid state, withdrawing the carbon dioxide from the tank, pumping liquid carbon dioxide down the well with a high pressure pump, passing the carbon dioxide withdrawn from the tank through a vapor separator chamber where a liquid-vapor stream is separated from a predominantly liquid stream of carbon dioxide, feeding the predominantly liquid stream to a high pressure side of a heat exchanger, feeding the liquid-vapor stream to a low pressure side of the heat exchanger to further cool the predominantly liquid stream passing through the high pressure side of the heat exchanger, recirculating expanded vapor from the low pressure side of the heat exchanger to the tank, and passing the cooled liquid stream of carbon dioxide flowing through the heat exchanger to the high pressure well pump for pumping into the well, the improvement comprising:

maintaining a minimum back pressure within the low pressure side of said heat exchanger by providing a back pressure valve in the recirculation path from said low pressure side of said heat exchanger leading to said tank.

2. The method of claim 1, wherein said backpressure valve is set to provide a minimum back pressure within the low pressure side of said heat exchanger in the range from about 75 psi to 150 psi.

3. The method of claim 2, wherein said back pressure valve provides a minimum back pressure greater than about 100 psi.

4. The method of injecting carbon dioxide of claim 1, wherein the liquid-vapor stream from the vapor separator chamber is fed through a feed line to the low pressure shell side of the heat exchanger and wherein a pressure reducing valve is provided in said feed line to said heat exchanger, said pressure reducing valve being selectively adjustable to provide a constant pressure drop for the liquid vapor stream passing through said feed line to the low pressure side of said heat exchanger.

5. The method of claim 4, further comprising the step of:

providing a float controlled on-off valve in said feed line entering said low pressure side of said heat exchanger to thereby control the liquid level within said heat exchanger.

* * * * *